United States Patent [19]
Squires

[11] 3,957,458

[45] *May 18, 1976

[54] GASIFYING COAL OR COKE AND DISCHARGING SLAG FRIT

[76] Inventor: Arthur M. Squires, 245 W. 104 St., New York, N.Y. 10025

[ * ] Notice: The portion of the term of this patent subsequent to Oct. 8, 1991, has been disclaimed.

[22] Filed: Oct. 7, 1974

[21] Appl. No.: 512,867

Related U.S. Application Data

[63] Continuation-in-part of Ser. No. 410,070, Oct. 26, 1973, Pat. No. 3,855,070, which is a continuation of Ser. No. 167,686, July 30, 1971, abandoned, and a continuation-in-part of Ser. No. 257,432, May 26, 1972, Pat. No. 3,840,353.

[52] U.S. Cl............................................. 48/73; 48/63; 48/69; 48/76; 48/77; 48/78; 48/203; 48/206; 48/210; 252/373; 252/375
[51] Int. Cl.²........................... C10J 3/20; C10J 3/36; C10J 3/46; C10J 3/54
[58] Field of Search.................. 48/197 R, 202, 203, 48/204, 206, 210, 63, 64, 69, 73, 76, 78, 77; 252/373, 375

[56] References Cited
UNITED STATES PATENTS

| | | |
|---|---|---|
| 1,840,649 | 1/1932 | Winkler et al........................ 48/203 |
| 2,111,579 | 3/1938 | Winkler et al........................ 48/203 |
| 3,253,906 | 5/1966 | Secord................................ 48/63 X |
| 3,840,353 | 10/1974 | Squires............................... 48/203 |

*Primary Examiner*—Joseph Scovronek
*Attorney, Agent, or Firm*—Abraham A. Saffitz

[57] ABSTRACT

Granulated coals or cokes derived from coal, in sizes up to about ¾ inch and containing ash matter with an initial deformation temperature below about 2,300°F, are fed to a slow fluidized bed comprising relatively large particles of coke intermingled with roughly spherical ash agglomerates, maintained at about 1,900°F to about 2,450°F, and supplied with a gasification medium, for example, steam mixed with oxygen or air. A fast fluidized bed of coke fines is superimposed above the slow bed and is contiguous therewith. Gasification products are discharged together with relatively fine particles of coke, which are collected and returned to the fast bed. Ash agglomerates are withdrawn from the bottom of the slow bed via a standpipe leading to a slagging grate. Combustion of coke fines in a forehearth beneath the slagging grate creates slagging temperatures therein and at the grate. Molten slag falls through a taphole and into a pool of water, from which slag frit and water are discharged.

9 Claims, 3 Drawing Figures

GASIFYING COAL OR COKE AND DISCHARGING SLAG FRIT

CROSS-REFERENCE TO RELATED APPLICATIONS

This application is a continuation-in-part of my co-pending application Ser. No. 410,070, filed Oct. 26, 1973, now U.S. Pat. No. 3,855,0703,755,070, issued Dec. 17, 1974, which is a continuation of my application Ser. No. 167,686, filed July 30, 1971, now abandoned.

This application is also a continuation-in-part of my co-pending application Ser. No. 257,432, filed May 26, 1972, now U.S. Pat. No. 3,840,353, issued Oct. 8, 1974.

The instant application is also related to my two co-pending applications filed simultaneously herewith and entitled Gasifying Coal or Coke and Discharging Ash Agglomerates, application Ser. No. 512,841, and
Treating Carbonaceous Matter with Hot Steam, application Ser. No. 513,037.

FIELD OF THE INVENTION

The invention relates to an improved apparatus and method for gasifying granulated coal or coke derived from coal by reaction of the coal or coke with a gasification agent such as steam mixed with oxygen or air, or air acting alone, or gas mixtures containing carbon dioxide and oxygen.

DESCRIPTION OF THE PRIOR ART

U.S. Pat. Nos. 2,813,351 (Nov. 19, 1957), 2,866,696 (Dec. 30, 1958), 3,042,500 (July 3, 1962), 3,302,598 (Feb. 2, 1967), and 3,431,892 (Mar. 11, 1969) generally disclose a procedure for gasifying granulated coal or coke derived from coal in a fluidized bed resting upon a travelling grate and operating at a temperature and at a gas velocity to promote formation of roughly spherical ash agglomerates in the bed that remain freely fluidized intermingled with particles of coke comprising the greater part of the fluidized bed until the ash agglomerates come to rest upon the travelling grate, which carries the agglomerates out of the bed and dumps them into an ash pit. In one disclosure (3,302,598) the agglomerates move towards ash disposal via a gravitating bed of the ash agglomerates with countercurrent flow of air to burn off carbon trapped within the agglomerates. The arrangements of these patents do not lend themselves readily to construction for operation at an elevated pressure, as is desirable if the gas made from the coal or coke is to be burned or further processed at pressure. The arrangements also do not lend themselves readily to a modification that would permit the retention of fine particles of coke in a concentrated bed of appreciable density for their further reaction and ultimate extinction by the gasification process.

U.S. Pat. No. 3,253,906 (May 31, 1966) disclosed a gasifier employing a gravitating bed of lumps of coal or coke resting upon a slagging grate beneath which was a forehearth for gasification of fine sizes of coal or coke powder. The forehearth provided a slagging temperature beneath the slagging grate. The Journal of the Institution of Gas Engineers, vol. 5 (1965), pages 444–469, described the operation of this gasifier and discussed a disadvantage: that its gasification rate is so high and the residence time of the solid fuel near the grate is so short that lumps of noncarbonaceous matter in the fuel are not properly slagged if this matter has a high fusion temperature. The Preprints of the Division of Fuel Chemistry of the American Chemical Society, vol. 14, no. 2 (May 1970), pages 39–58, described the operation of equipment that appears to have been similar to the gasifier disclosed in the aforementioned U.S. Pat. No. 3,253,906. U.S. Pat. No. 3,437,561 (1969) disclosed use of this gasifier to process coke beads produced by hydropyrolysis of coal, with admixture of a fluxing agent if the coal's ash matter has a high fusion temperature.

BACKGROUND OF APPLICANT'S CO-PENDING APPLICATIONS

The aforementioned U.S. Pat. No. 3,855,070 disclosed a process for gasifying coke beads produced by the hydropyrolysis of a bituminous or subbituminous coal or lignite. The process employs an ash-agglomerating fluidized bed. , disclosed The aforementioned, now U.S. Pat. No. 3,840,353,disclosed a process for gasifying coal or coke derived from coal in a gasifier employing an ash-agglomerating slow fluidized bed of relatively large particles of coke with intermingled ash agglomerates together with a superposed contiguous fast fluidized bed of finer coke particles. This disclosure was primarily directed toward achieving a fuel gas in which the species hydrogen, carbon monoxide, and water vapor are present at concentrations which are substantially in thermodynamic equilibrium with carbon according to its reaction with steam. The temperature specified for the fluidized beds, between about 1,900°F and about 2,100°F, was selected in view of the two objectives, of achieving this equilibrium at approximately the lowest possible temperature for a given coal or coke feedstock, and of forming ash agglomerates containing little carbon from the ash matter of the feedstock.

GENERAL DESCRIPTION OF THE INVENTION

The instant application disclosed apparatus and method for a wide range of coal- or coke-gasification process objectives, and more particularly useful for gasifying a coal or coke of relatively low ash-softening temperature with air to produce a fuel gas having a heating value of about 125 to 150 British thermal units (Btu) per cubic foot, that is to say, the so-called low-Btu gas or power gas or utility gas. The apparatus and method is also particularly useful for gasifying a coal or coke of relatively low ash-softening temperature with steam and air enriched in oxygen, enriched to an oxygen content of 50 volume per cent for example, to provide an industrial fuel gas having a heating value of about 240 to 270 Btu per cubic foot, for example. I contemplate the production of these fuel gases on an extremely large scale to serve large industrial furnaces and boilers with a clean fuel gas. For such service, production of the gas with substantially complete utilization of carbon is an economically important objective.

I have found that a higher temperature than that specified in the aforementioned co-pending application Ser. No. 257,432, now U.S. Pat. No. 3,840,353, is often peculiarly desirable for gasification with air or mixtures of steam and air enriched in oxygen, where either little steam is present or such steam as is present is diluted by non-reacting nitrogen gas. This is apparently because much of the carbon must be gasified with carbon dioxide gas rather than with the more reactive steam. Especially in the case of relatively non-reactive coals such as anthracites and bituminous coals of higher rank, the objective of complete utilization of carbon makes use of the higher temperatures desirable, although I should point out that operation at the higher temperature of the instant invention generally involves giving up the earlier objective of attaining the aforementioned thermodynamic equilibrium. Of the two objectives, the complete utilization of carbon is the more important in the production of a gas for prompt combustion in an industrial furnace or boiler.

The apparatus of the instant invention uses a slagging grate much resembling that disclosed in the aforementioned U.S. Pat. No. 3,253,906, but with the advantage that here the grate is used primarily to melt ash matter and not for this purpose together with the simultaneous objective of providing a gasification zone for lumps of coke. Accordingly, operation of the grate can concentrate upon the one objective of melting ash matter, and its operation is not embarrassed by the aforementioned disadvantage arising from the high gasification rate that it affords. Other advantages of the combination of the instant invention will appear hereinafter.

OBJECTS OF THE INVENTION

An object of the invention is to provide improved apparatus for gasifying coal or coke by its reaction with air, mixtures of air with steam or carbon dioxide or combustion products, and mixtures of oxygen or air enriched in oxygen with steam or carbon dioxide.

Another object is to provide apparatus and procedure for gasifying coal or coke that utilizes carbon with outstandingly good efficiency, converting substantially all of the carbon in coal or coke into gaseous species.

Another object is to provide apparatus and procedure particularly suited for gasifying coals containing ash matter that displays a relatively low initial deformation temperature as determined by A.S.T.M. test, as well as cokes derived from such coals, with capability of discharging the ash matter in form of a slag frit containing little carbon.

Another object is to provide apparatus and procedure for converting coal or coke into fuel gases including mixtures of hydrogen, carbon monoxide, and methane, as well as mixtures of these fuel species with nitrogen.

Another object is to provide apparatus and procedure for converting coal or coke into carbon monoxide and mixtures of this species with hydrogen suitable for a variety of chemical syntheses as well as for conversion into relatively pure hydrogen.

SUMMARY OF THE APPARATUS FEATURES OF THE INVENTION

The invention relates to an improved apparatus for gasifying granulated coal or coke derived from coal. There is provided a vessel housing contiguous upper and lower zones. Means are provided for feeding a granulated solid fuel, coal or coke derived from coal, to the vessel. Means are provided for introducing a gasification medium as fluidizing gas into the lower zone at a rate to establish therein a slow fluidized bed comprising particles of coke arising from the fuel intermingled with agglomerates of ash matter. The temperature of the slow fluidized bed is preferably between about 1,900°F and about 2,450°F. The fluidizing-gas velocity in the bed is greater than about 4 feet per second. A pipe conducts gas from an outlet at substantially the top of the upper zone to a means for substantially separating gas and solids, suitably a cyclone gas-solid separator. A pipe conducts separated gas from the separating means and discharges the gas. There are means for conducting the separated particles in a slow fluidized condition from the separating means to substantially the bottom of the upper zone. Means are provided for establishing a fast fluidized bed of the separated particles in the upper zone along with fine particles of coke that enter the upper zone from the slow fluidized bed of the lower zone; these means include means for regulating the rate of flow of the separated particles in the aforementioned slow fluidized condition. A standpipe conducts agglomerates of ash matter away from the bottom of the lower zone. This standpipe terminates in a slagging grate, the agglomerates in the standpipe constituting a gravitating bed resting upon the slagging grate. A forehearth is provided beneath the slagging grate together with means for supplying fuel and oxidizing medium to the forehearth at a rate to maintain therein a slagging temperature and to supply hot combustion products to the bottom of the gravitating bed at a rate and temperature sufficient to melt the ash agglomerates. These combustion products are preferably oxidizing in character with respect to metallic iron. There is a taphole in the bottom of the forehearth, conducting molten slag to a pool of water beneath the taphole. Means are provided for conducting water and slag frit from the pool.

The fluidizing-gas velocity in the aforementioned slow fluidized bed of coke intermingled with ash agglomerates is preferably greater than about 7 feet per second.

SUMMARY OF THE OPERATING FEATURES OF THE INVENTION

For operating the apparatus of the invention, suitable solid fuels are anthracites, subanthracites, bituminous coals, subbituminous coals, and lignites, or cokes prepared from these materials. The ash matter in the fuel preferably displays an initial deformation temperature by the A.S.T.M. test below about 2,300°F. Important United States coals, notably the bituminous coals of Illinois and other Eastern states, contain ash with initial deformation temperatures below about 2,300°F.

A suitable gasification medium is a mixture of oxygen or air enriched in oxygen with steam or carbon dioxide. Also suitable are mixtures of air with steam, of air with carbon dioxide, and of air with combustion products containing carbon dioxide. Air alone is a suitable gasification medium, and is preferred for production of low-Btu gas for prompt combustion in an industrial furnace or boiler, as well as for combustion in a gas turbine or in a system combining gas-turbine and steam-turbine power equipment. For the latter purpose, there is an advantage in providing apparatus according to the invention for operation at elevated pressure, preferably greater than 10 atmospheres.

A suitable oxidizing medium for supply to the forehearth is air or a mixture of air with steam or carbon dioxide or combustion products. Another suitable oxidizing medium is a mixture of oxygen or air enriched in oxygen with steam or carbon dioxide. The oxidizing medium is often preferably the same gas mixture as that used for the gasification medium.

DISTINCTION BETWEEN SLOW AND FAST FLUIDIZED CONDITIONS

I will now explain the distinction between the slow, stationary, bubbling fluidized bed of the kind usual in fluidization art and the fast fluidized bed specified for the upper zone.

In a slow fluidized bed, the fluidized solid remains in place, the bed displays a distinct upper surface, and the bed is characterized by a relatively continuous solid phase and a relatively discontinuous gas phase. The solid mainly occupies the so-called dense phase, through which gas flows at a velocity that is characteristic of the solid. Additional gas, supplied in excess of gas just needed to sustain this characteristic velocity, passes upward through the bed in form of rising voids or bubbles.

A fast fluidized bed exhibits no upper surface but substantially fills the space available. The solid phase in the fast bed appears on the whole to be the discontinuous phase, and the gas phase appears on the whole continuous. The solid phase appears generally to take the form of streamers and ribbons that both rise and fall, while the gas appears to flow upward inbetween. A fast bed is created when both powder and gas are supplied to the bottom of a space at suitable rates. Although the powder is conveyed upward through the fast bed and out of the bed at the top, much refluxing of the solid occurs in the fast bed in form of falling ribbons or streamers of solid. It should be noted that these remarks are based upon visual observation of the fast fluidized condition, as well as upon viewing of motion pictures of a fast bed taken at high speed, when the fast bed exhibited a density between about 2 and 4 pounds per cubic foot. Densities as high as 8 to 10 pounds per cubic foot can be achieved for a powder having a particle density of 55 pounds per cubic foot and a median particle diameter of about 60 microns with a range of diameter between about 20 and about 150 microns. At these higher densities, observation of the details of the structure of the fast bed becomes more difficult, but such observation suggests that both solid and gas phases become on the whole continuous at the higher densities. It appears that the streamers and strands of the powder become linked in a system of rapidly circulating material that includes many vortices resembling tiny tornadoes, that is to say, a reticulated net of strands in three dimensions that are continually forming and breaking down and moving rapidly up and down and from side to side and especially in circular motions.

To achieve the fast bed condition, the gas must be supplied at a rate to provide a velocity in the fast bed space beyond a critical velocity characteristic of the powdered solid. For example, for the aforementioned powder, the critical velocity of atmospheric air for creation of the fast fluidized condition is about 6 feet per second. At a gas velocity beyond the critical velocity and preferably not greater than about 25 feet per second, the fast fluidized condition is realized if solid is supplied to the bottom of the space at a rate beyond that at which the gas flowing at the given velocity is capable of conveying the solid upward in the so-called dilute-phase condition. It should be noted that even in dilute-phase conveying of a fine solid powder in the upward direction, contrary to the impression created by many discussions of the subject, the solid moves in streamers or strands or ribbons. The transition from dilute-phase conveying to the fast fluidized bed, that will be seen to occur in an experiment in which solid input to the bottom of the space is gradually increased while gas velocity is held fixed, involves the sudden appearance of falling ribbons or streamers intermingled with rising ribbons or streamers. As solid input is further increased, the aforementioned net of rapidly vortexing solid strands develops.

The aforementioned critical gas velocity necessary to achieve the fast bed condition is a function of particle size, being larger for particles of larger size. From a discussion with experts on formation of hail stones, it would appear that nascent hailstones in a storm cloud may resemble a fast fluidized bed. This discussion gives rise to the impression that there is no upper limit to the size of particle that can be placed into the fast fluidized condition provided a gas supply sufficiently great and a vessel sufficiently large be available.

COKE PARTICLE SIZE IN FAST FLUIDIZED BED ZONE

For operation of the apparatus of the instant invention, it will be appreciated that the coke dust of the fast fluidized bed of the upper zone is inherently relatively fine by comparison with the larger particles present in the coal or coke feed. If the solid fuel charged to the apparatus has been prepared by crushing to a size smaller than ¼ inch, for example, the feed fuel will inherently contain some material smaller than 150 microns, for example. Even should the feed fuel consist exclusively of large particles (when, for example, fine particles have been withdrawn from the feed fuel for application elsewhere), the gasification of the large particles in the slow fluidized bed of the lower zone will produce fine particles that will enter the upper zone. Gasification of a carbon particle proceeds throughout the interior of the particle. There is eventually produced a skeleton structure that spontaneously breaks up into finer particles. Operation of the apparatus of the invention should preferably aim to maintain particles in the fast bed of the upper zone that are between about 20 and about 150 microns in size. If their size should fall much below about 20 microns, it will be advisable to feed lesser amounts of fine sizes in the solid feed fuel and generally to provide a coarser feed material. It may also be advisable to withdraw material from the fast bed for disposal elsewhere as in a combustion for example. If the particles in the fast bed rise much above about 150 microns in size, it will be advisable to provide a finer feed fuel.

THERMAL COMMUNICATION ADVANTAGE OF THE FAST BED

In contrast to the poor thermal communication afforded by the dilute-phase condition, a fast fluidized bed exhibits good thermal conductivity in vertical as well as lateral direction. When the aforementioned transition from dilute-phase conveying to the fast fluidized condition occurs, there is a sharp advance in thermal conductivity.

As my aforementioned U.S. Pat. Nos. 3,840,353 and 3,855,070 disclosed, there is good thermal communication between a fast fluidized bed of relatively finer solid and a subposed, contiguous slow bubbling fluidized bed of relatively coarser solid. Accordingly, the fast fluidized and slow fluidized beds of upper and lower zones respectively of the apparatus of the instant invention will be at substantially the same temperature in spite of the fact that a relatively large quantity of heat is released in the slow fluidized bed by virtue of the rapid reaction therein of oxygen with carbon to form carbon dioxide. Much of this heat will flow by conduction from the slow bed to the superposed fast bed to sustain in the latter bed the slow endothermic reactions of steam and carbon dioxide with carbon to form carbon monoxide and hydrogen.

As further disclosed in my aforementioned U.S. Pat. No. 3,840,353, there is exceptionally effective transfer of heat from hot particles of a fast fluidized bed to a cold particle introduced thereinto. This property of the fast bed becomes important if a caking bituminous coal is to be treated by the apparatus of the invention. In such case, it is advantageous to situate the means for feeding the solid fuel into the vessel at an elevation such that the fuel enters the vessel at an elevation intermediate between top and bottom of the upper zone. With this arrangement, fine particles in the coal turn promptly into particles of fine coke and join the particles of the upper zone, while large particles of coal undergo rapid heating as they fall through the fast fluidized bed zone, so that an outer skin of each such particles is thoroughly coked by the time the particle reaches the slow fluidized bed below. The height of the point of entry of coal above the lower zone is preferably such as to allow at least about 1 second time of fall of the largest particle in the coal feed before it reaches the lower zone. By this arrangement, a highly caking bituminous coal can be introduced into the gasification bed without risk of formation of a massive agglomerate of coke solids, such as have frequently appeared in previous attempts to gasify such a coal in a fluidized bed. The arrangement obviates any necessity for a coal pretreatment step involving a light oxidation of the coal to reduce its caking and agglomerating tendencies.

CAPACITY ADVANTAGE OF THE FAST FLUIDIZED BED

A further advantage of the fast fluidized bed is that it can treat gas at a high throughput per unit cross-sectional area while yet maintaining a relatively large inventory of carbon for purpose of promoting the aforementioned slow endothermic reactions of carbon with steam and of carbon with carbon dioxide. For example, solid fluidized densities approaching 10 pounds per cubic foot can be sustained at a gas velocity in the neighborhood of 10 feet per second. The fast bed may be of almost any height that is practicable to build and to site in view of requirements for safety of air travel or in view of other siting considerations. It is evident that the fast bed affords an exceptional capability for bringing the gasification agents steam and carbon dioxide into intimate contact with carbon in form of fine particles in a vessel of exceptionally small cross-sectional area. The fast bed also provides for good utilization of fine carbon particles created by gasification.

SUMMARY OF FEATURES OF THE SLAGGING GRATE

The slagging grate of the invention advantageously comprises a number of parallel, closely spaced, water-cooled stainless-steel tubes, together with a forehearth chamber beneath the grate in which fuel is burned to produce gases at a temperature sufficient to melt and slag the ash matter descending in a gravitating bed toward the grate. An advantage of the apparatus of the invention is that the forehearth need not provide all of the gasification medium to the carbon-containing zones of the gasification vessel (as was the case for the apparatus of U.S. Pat. No. 3,253,906 already cited). Rather, the gases leaving the forehearth can serve the more limited function of providing heat to melt ash matter. With this limited function, the gases from the forehearth can better be requlated in chemical composition so that they are highly oxidizing with respect to iron and ferrous sulfide. These are materials of relatively low melting point in presence of reducing gases, by comparison with coal ash; and, particularly troublesome, they are materials of exceedingly low viscosity relative to slags: they tend to seek out cracks in refractory materials that protect the steel walls of the apparatus, and their presence gives rise to danger of a breakout of hot molten material through a failure of the walls.

A further advantage in respect to U.S. Pat. No. 3,253,906 is that the ash agglomerates descend in the gravitating bed "at their own rate", and not at a rate determined by the consumption of lumps of carbonaceous fuel resting upon the grate, the latter rate having been revealed in the aforementioned Institution of Gas Engineers reference to be sometimes too rapid for proper slagging of refractory material.

As mentioned hereinbefore, the gasification of coal or coke in a fluidized bed tends to produce a large quantity of coke fines, often smaller than 10 microns in size. Such fines are advantageously recovered by a second-stage cyclone gas-solid separator following a first-stage cyclone that serves as the aforementioned means for separating gas and solids withdrawn at substantially the top of the upper zone. The recovered fines are sometimes advantageously used as at least a portion of the fuel burned in the forehearth.

BRIEF DESCRIPTION OF THE DRAWINGS

The invention including various novel features will be more fully understood by reference to the accompanying drawings and the following description of the operation of the apparatus illustrated therein.

DESCRIPTION OF THE PREFERRED EMBODIMENTS

Figure 1A:
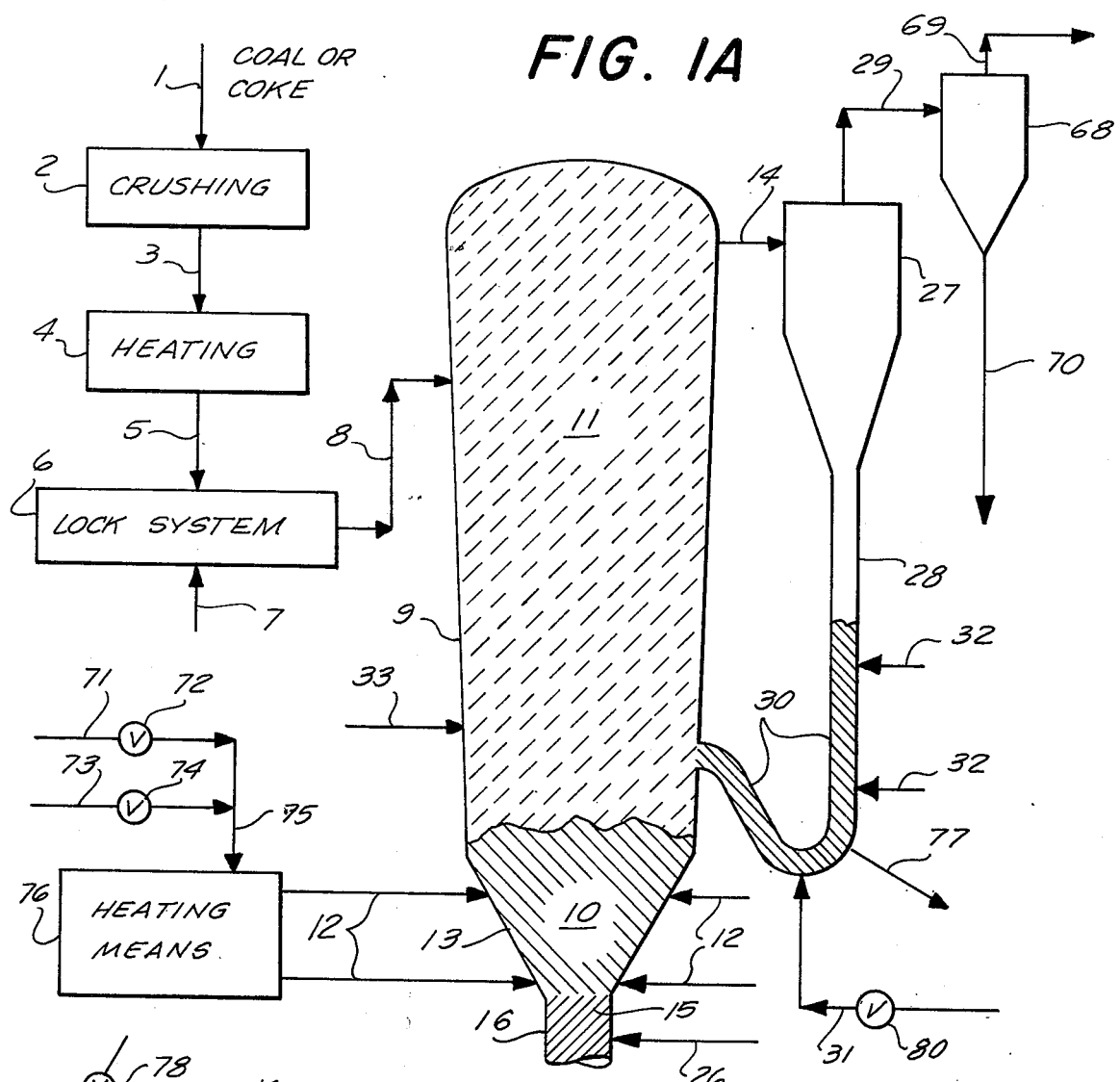
FIGS. 1A and 1B, viewed together, provide a schematic diagram of an embodiment of the invention.
Figure 1B:
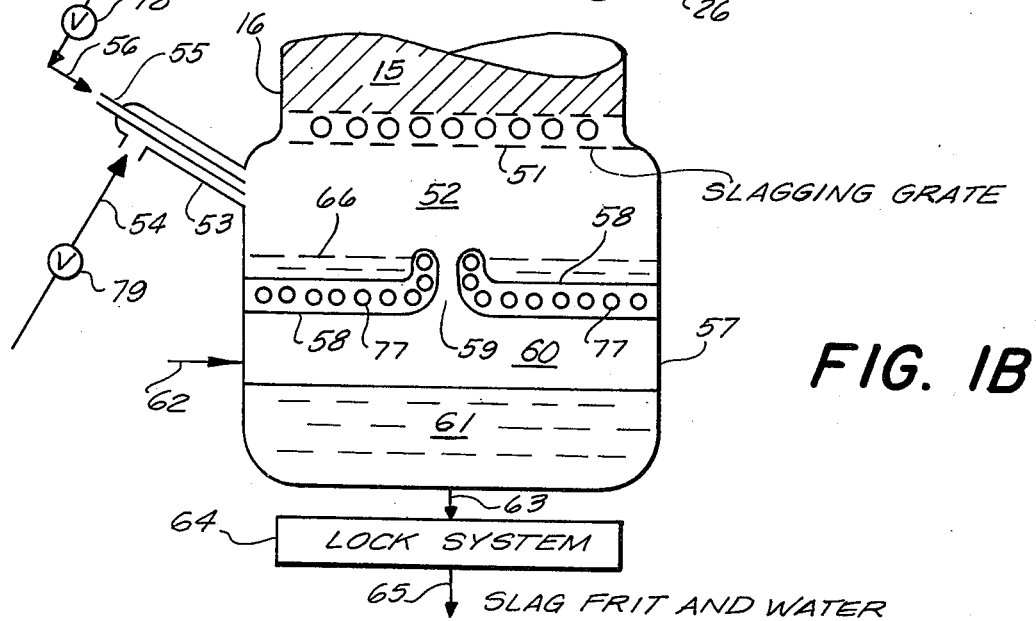

Reference is now made to the schematic diagrams of FIGS. 1A and 1B. Crushing means 2 crushes anthracite, subanthracite, bituminous, or subbituminous coal or lignite, or a coke produced from these materials, from line 1 to a size preferably smaller than about ¾ inch. The ash matter in the fuel preferably displays an initial deformation temperature below about 2,300°F. It is sometimes advantageous to admix a finely pulverized slagging agent, such as blast furnace slag or lime, to reduce the fusion temperature of the combined mineral matter supplied to line 3, which conveys crushed solid from crushing means 2 to drying-and-heating means 4. Line 5 carries dried and heated coal to lock system 6, which is supplied with a gas from line 7. Lock system 6 preferably has the form disclosed in U.S. Pat. No. 3,710,192 (1973). Coal passes from lock system 6 into vessel 9 via line 8. In a unit of large throughput, a multiplicity of lines 8 is advantageously provided, but for simplicity of the drawing, only one line 8 is shown. Vessel 9 houses slow fluidized bed 10, comprising coke particles of relatively larger sizes undergoing gasification intermingled with growing agglomerates of ash matter. Gas from bed 10 rises through contiguous superposed space 11 and conveys coke particles of relatively smaller sizes upward to outlet pipe 14. Larger particles present in the coal feed fall from line 8 into bed 10 and are coked with release of volatile matter. Smaller particles present in the coal feed join the fine coke of space 11 and are also coked with release of volatile matter. The relatively smaller coke particles present in space 11 advantageously constitute a fast fluidized bed, in order to provide a higher solid density in space 11 and a correspondingly larger inventory of carbon for reaction with steam or carbon dioxide.

Gasification medium is introduced into bed 10 from a multiplicity of substantially horizontal inlet pipes 12 penetrating frusto-conical segment 13 of the walls of vessel 9. The included angle of segment 13 is preferably about 60°. The gasification medium may be oxygen and steam, if a gas comprising primarily hydrogen and carbon monoxide is desired, or oxygen and carbon dioxide to obtain a gas comprising primarily carbon monoxide. The medium may be air and steam, or air and carbon dioxide, or air and combustion products containing carbon dioxide, if a fuel gas of low heating value is desired for prompt combustion. The gasification medium may also comprise simple air. A mixture of air enriched in oxygen with steam or carbon dioxide is also suitable. The temperature of the gasification medium is adjusted by heating means 76 and the composition of the medium is adjusted by regulating the flows from sources 71 and 73 of separate agents present in the gasification medium by means of valves 72 and 74 respectively. For example, oxygen might be supplied from 71 and steam from 73. The adjustments of temperature and composition of gasification medium are preferably made so that the temperature of bed 10 is between about 1,900° and 2,450°F. The superficial fluidizing-gas velocity in bed 10 should be greater than the minimum fluidizing velocity of a bed of coal particles of substantially the largest size present in the coal feed. In general, the velocity should be greater than about 4 feet per second, and is preferably greater than about 7 feet per second.

The pressure in vessel 9 is in general preferably superatmospheric. If, however, vessel 9 operates at substantially atmospheric pressure, lock system 6 may be omitted.

When a strongly caking bituminous coal is treated, the relatively smaller coke particles in space 11 should be placed into the fast fluidized bed condition. Line 8 should enter vessel 9 at an elevation between the upper surface of bed 10 and outlet line 14. The height of fast-fluidized-bed space 11 and the location of line 8 should be such to allow preferably at least about 1 second residence time for fine particles in the coal in space 11 before such particles are blown out of space 11 via line 14, this residence time being reckoned on basis of the superficial gas velocity in space 11 and the difference in elevation of lines 8 and 14. Also, the height of space 11 and location of line 8 should be such to allow preferably at least about 1 second residence time within space 11 for the largest coal particles as they fall toward bed 10, this time being reckoned on basis of the free fall velocity of such particles and the difference in elevation of the upper surface of bed 10 and line 8.

Under the conditions specified for bed 10 and space 11, both volatile matter and coke react with gasification medium to form a mixture of $CH_4$, $H_2$, $CO$, $H_2O$, and $CO_2$ (together with $N_2$ if the gasification medium includes air). Gases leaving space 11 via line 14 contain negligible amounts of tar and small amounts of hydrocarbons higher than methane.

As coke is consumed in bed 10 by gasification reactions, the larger coke particles comprising bed 10 waste away, and as a consequence, ash matter is released and coke dust is formed. The coke dust enters space 11. At a temperature in the range specified for bed 10, the ash matter of substantially all coals is sticky. Ash sticks to ash, not to coke; and, as ash matter is released, ash agglomerates form and grow in size. At the fluidizing-gas velocity specified for bed 10, ash agglomerates grow in roughly spherical form, and individual ash agglomerates do not coalesce to irregular masses of agglomerated ash of such large size as to block the flow of gas in bed 10.

When an ash agglomerate grows too large to remain fluidized at the velocity prevailing in bed 10, the agglomerate sinks to the bottom of bed 10 and enters zone 15 in section 16 of vessel 9. Section 16 has a substantially vertical wall, or zone 15 may sometimes advantageously be somewhat larger in horizontal cross-section at bottom than at top. Zone 15 is occupied by a gravitating bed of ash agglomerates, the discharge of agglomerates from zone 15 being governed by slagging-grate 51, seen in FIG. 1B. The bed of ash agglomerates is supported by slagging-grate 51, comprising closely-spaced parallel stainless-steel tubes, of 5/12 inch outside diameter, say, cooled by water flowing inside the tubes (the water being supplied to the tubes and withdrawn therefrom through pipes not shown in FIG. 1B). Oxidizing medium (suitably the same gas mixture as the gasification medium supplied to zone 10 through pipes 12, or a mixture of the same chemical species at a different composition) is supplied to space 52 below grate 51 via pipe 53 from supply 54, and fuel is supplied to space 52 via pipe 55 from supply 56. Space 52 constitutes a forehearth serving primarily to supply heat to the underneath sides of grate-tubes 51, and also sometimes advantageously serving as a combustion or gasification zone to consume fine sizes of coal or coke introduced from supply 56 via pipe 55. A liquid or gaseous fuel may also be supplied from 56. The rate of fuel supply to pipe 55 is adjusted by valve 78, and the rate of flow of oxidizing medium to pipe 53 is adjusted by valve 79, the adjustments being made to maintain a slagging temperature in forehearth 52, and also preferably to maintain oxidizing conditions therein in respect to molten metallic iron and molten ferrous sulfide. Gases rising from forehearth 52 across slagging-grate 51 create a zone of high temperature directly above the slagging grate, causing ash agglomerates to melt. Molten slag flows downward across slagging-grate 51 and falls into slag pool 66 resting upon partition 58 that divides section 57 of vessel 9 horizontally. Partition 58 is cooled by tubes 77 within which water is flowing as a cooling medium (the water being supplied to tubes 77 and withdrawn therefrom through pipes not shown in FIG. 1B). Slag flows from pool 66 through taphole 59 in partition 58, the slag falling across space 60 into water pool 61. Notice that most of the surface or gas space seen by grate-tubes 51 is maintained at a high temperature, so that little radiative cooling of these tubes can occur. The sudden cooling of slag in pool 61 causes the slag to break apart into a frit. Water is supplied to pool 61 from line 62. Slag frit and water are removed from pool 61 via line 63, and let down to the atmosphere by means of lock system 64 and line 65.

If desired, ash agglomerates may be fluidized in a portion of zone 15 by introducing additional gasification medium via several optional ines 26, seen in FIG. 1A, at a rate to maintain an appreciably higher fluidizing-gas velocity in the upper part of zone 15 than in bed 10. This expedient will serve to reduce the quantity of coke entering zone 15 at the top along with ash agglomerates.

Gas product leaves the top of zone 11 in FIG. 1A via pipe 14, and enters cyclone gas-solid separator 27. Solid removed from the gas by separator 27 is returned via standpipe-and-U-tube 28 back into zone 11 near its bottom elevation.

Gas product of greatly reduced dust content passes from separator 27 via line 29 to second-stage cyclone gas-solid separator 68. Substantially dust-free gas leaves the apparatus of the invention via line 69 from separator 68, and may advantageously flow to further equipment for cleaning the gas of last traces of dust, for removing sulfur species, or for other treatment. Dust removed in separator 68 is advantageously passed via line 70 to fuel supply 56.

Line 31 provides aeration gas to fluidize coke dust in standpipe-and-U-tube 28 with formation therein of space 30 in which fine coke particles are maintained in the slow-fluidized state. Aeration lines 32 are also advantageously provided. Valve 80 is provided to control flow of aeration gas in line 31, which furnishes a control on flow of fine coke particles from space 30 to bed 11. The rate of flow of solid from space 30 to bed 11 should match the rate of discharge of solid from fast fluidized bed 11 to cyclone 27 via line 14. This rate of discharge is a function of the inventory of solid in bed 11, a larger inventory giving rise to a larger rate of discharge of solid. From another point of view, the rate of flow of solid from space 30 to bed 11 is a control on the inventory of solid in bed 11, a higher rate of flow serving to increase the inventory. The rate of flow should preferably be sufficient to maintain a fast fluidized condition in bed 11. If desired, a valve (not shown in FIG. 1A) may be supplied in tube 28 to assist in control of the rate of circulation of coke dust. If desired, line 77 may be provided to remove coke dust from sapce 30 for delivery via line 77 to fuel supply 56.

Aeration gas supplied via line 31 is advantageously steam, in accordance with the disclosure of my aforementioned U.S. Pat. No. 3,840,353.

Optionally, additional gasification medium may be furnished through a multiplicity of optional lines 33 near the bottom of zone 11.

Make-gas from line 69 may conveniently be used to supply gas to line 7.

EXAMPLE

I now give an example of an operation of the equipment depicted in FIGS. 1A and 1B. Illinois bituminous coal is supplied through line 1 in an amount comprising 100,000 pounds per hour of a moisture-free coal having the following analysis (expressed in weight per cent):

```
69.7 carbon
 5.3 hydrogen
 9.9 oxygen
```

-continued
```
 1.3 nitrogen
 3.8 sulfur
10.0 ash
```

The higher heating value of the coal is 12,755 Btu per pound (dry basis). The coal is dried to a moisture content of 3 weight per cent intrinsic moisture and is heated to 300°F in means 4. Make-gas from line 69 is used in line 7. Gasification medium supplied to lines 12 comprises 688.4 pound-moles per hour (m./hr.) of steam and 4,011.1 m./hr. of a gas containing 50 volume per cent (%) of oxygen, 49.38% nitrogen, and 0.62% argon, that is to say, an air enriched in oxygen. The gasification medium is supplied at 920°F. Aeration gas from line 31 comprises 100 m./hr. of steam at 920°F. Oxidizing medium from supply 54 has the same composition as the gasification medium and is at the same temperature and comprises 325.2 m./hr. of the air enriched in oxygen and 55.8 m./hr. of steam. The slag frit amounts to 10,000 pounds per hour. Beds 10 and 11 operate at 2,200°F and 20 atmospheres. Make-gas in line 69 amounts to 11,430.2 m./hr. and has the following composition (expressed in mole per cent):

```
48.8 CO
 1.0 CO₂
 1.0 CH₄
27.3 H₂
 1.5 H₂O
 1.0 H₂S
19.2 N₂
 0.2 A
```

The gas has a higher heating value of 262 Btu per cubic foot, and is eminently well suited for industrial fuel purposes after hydrogen sulfide has been substantially removed. In the example, fuel to forehearth from supply 56 comprises coke fines withdrawn via pipes 70 and 77.. The slagging grate operates at about 2,800°F.

Figure 2:
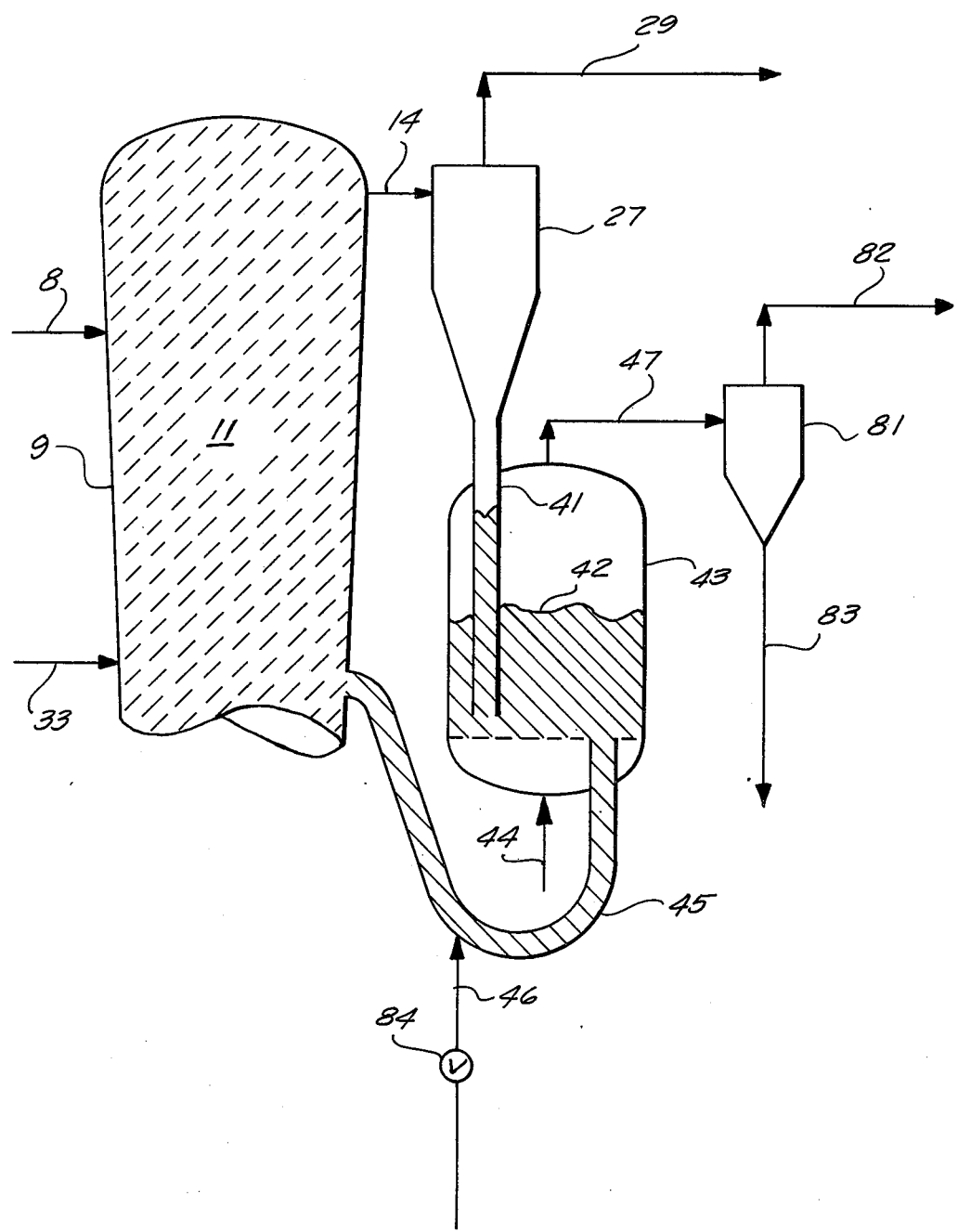
FIG. 2 is a schematic diagram of an alternative embodiment for recovering coke fines.

Turning now to FIG. 2, I describe an alternative embodiment which may sometimes be preferred. Items 8, 9, 11, 14, 27, 29, and 33 in FIG. 2 function in substantially the same manner as that already described for these items in FIG. 1A. Coke fines from cyclone separator 27 pass via standpipe 41 into slow fluidized bed 42 housed in vessel 43 and fluidized with gas from line 44, preferably steam. Coke fines flow from bed 43 to zone 11 via standpipe-and-U-tube 45, which is aerated with gas from line 46, the rate of flow of this gas being regulated by valve 84 and constituting a control on rate of flow of solid in line 45. Offgas from bed 42 leaves vessel 43 via line 47 and flows to cyclone gas-solid separator 81, which delivers cleaned gas via line 82 and fine coke particles via standpipe 83; the fine coke particles in standpipe 83 may advantageously be sent to fuel supply 56 seen in FIG. 1B.

I do not wish my invention to be limited to the particular embodiments illustrated in the drawings and described above in detail. Other arrangements will be recognized by those skilled in the art, as well as other purposes which the invention can advantageously serve.

I claim:

1. Apparatus for gasifying granulated coal or coke prepared from coal, comprising:
   a. a vessel housing contiguous upper and lower zones;
   b. means for feeding to said vessel a granulated solid fuel selected from the group consisting of anthracites, subanthracites, bituminous coals, subbituminous coals, lignites, and cokes prepared from anthracites, subanthracites, bituminous coals, subbituminous coals, and lignites;

c. means for introducing a gasification medium into said lower zone wherein said medium is selected from the group of gas mixtures consisting of steam and oxygen, carbon dioxide and oxygen, steam and air enriched in oxygen, carbon dioxide and air enriched in oxygen, air, air and steam, air and carbon dioxide, and air and combustion products containing carbon dioxide and wherein the rate of said introduction is such as to establish in said lower zone a slow fluidized bed comprising particles of coke originating from said fuel intermingled with agglomerates of ash matter and wherein the temperature of said slow fluidized bed is between about 1,900°F and about 2,450°F and wherein the fluidizing-gas velocity in said bed is greater than about 4 feet per second;

d. means for substantially separating gas and solid particles and a connection of said means to the top of said upper zone;

e. pipe means for discharging said separated gas;

f. means for conducting said separated particles in a slow fluidized condition from said separating means (d) to substantially the bottom of said upper zone at a rate of flow of said separated particles into said upper zone sufficient to establish therein a fast fluidized bed of said separated particles together with fine particles of coke entering said upper zone from said slow fluidized bed in said lower zone;

g. a standpipe for conducting agglomerates of ash matter away from the bottom of said lower zone wherein said standpipe terminates in a water-cooled slagging grate for discharging said conducted agglomerates in molten form and wherein said conducted agglomerates constitute a gravitating bed in said standpipe and wherein said gravitating bed rests upon said slagging grate;

h. a forehearth beneath said slagging grate;

i. means for supplying fuel and oxidizing medium to said forehearth at a rate to maintain therein a slagging temperature and to supply hot combustion products to the bottom of said gravitating bed at a rate and temperature sufficient to melt said agglomerates to form molten ash matter and wherein said combustion products are oxidizing in character with respect to iron and wherein said molten ash matter discharges from said gravitating bed by dropping from said slagging grate to the floor of said forehearth;

j. a taphole in the floor of said forehearth for conducting said molten ash matter out of said forehearth;

k. an enclosed space beneath said floor of said forehearth housing a pool of water below said taphole to catch said molten ash matter conducted from said forehearth via said taphole; and l. means for conducting water and slag frit from said pool of water.

2. Apparatus of claim 1 in which said granulated solid fuel is selected from the group consisting of caking bituminous coals, and wherein said means (b) is situated at an elevation such that said granulated solid fuel enters said vessel at an elevation intermediate between said top and said bottom of said upper zone.

3. Apparatus of claim 1 including means for injecting coke fines into said forehearth, said coke fines comprising at least a part of said fuel supplied to said forehearth in (i).

4. Apparatus of claim 1 in which said means for introducing said gasification medium in (c) is capable of maintaining a rate of introduction such that the fluidizing-gas velocity in said slow-fluidized bed in (c) is greater than about 7 feet per second.

5. Apparatus of claim 1 in which said vessel in (a) is capable of housing said upper and lower zones at a pressure greater than about 10 atmospheres.

6. A process for gasifying granulated coal or coke prepared from coal, comprising:

a. supplying a granulated solid fuel selected from the group consisting of anthracites, subanthracites, bituminous coals, subbituminous coals, lignites, and cokes prepared from anthracites, subanthracites, bituminous coals, subbituminous coals, and lignites to a vessel housing contiguous upper and lower fluidized bed zones which are at a temperature between about 1,900°F and about 2,450°F and wherein said lower zone comprises a slow fluidized bed of larger particles of coke orginating from the larger particles of said granulated fuel together with particles of agglomerated ash matter wherein said ash matter was originally present in said granulated fuel and wherein said upper zone comprises a fast fluidized bed of smaller particles of coke originating from the smaller particles of said carbonacoues matter and also from the degradation of said larger particles of coke of said lower zone;

b. supplying a gasificatiom medium as fluidizing gas to said lower zone at a fluidizing gas velocity greater than about 4 feet per second at said temperature and wherein said gasification medium is selected from the group of gas mixtures consisting of steam and oxygen, carbon dioxide and oxygen, steam and air enriched in oxygen, carbon dioxide and air enriched in oxygen, air, air and steam, air and carbon dioxide, and air and combustion products containing carbon dioxide;

c. withdrawing products of the gasification of said fuel together with said smaller coke particles from substantially the top of said upper zone, substantially separating said products of gasification from said smaller coke particles, causing said separated smaller coke particles to flow into a region in which said smaller coke particles are maintained in a slow fluidized condition, and causing said smaller coke particles to flow from said region into said upper zone at a rate sufficient to maintain a fast fluidized condition in said upper zone;

d. withdrawing particles of agglomerated ash matter from the bottom of said lower zone;

e. conducting said withdrawn particles of agglomerated ash matter in a gravitating bed to a space;

f. supplying a fuel and an oxidizing medium to said space to burn therein to supply hot combustion products and to maintain in said space a temperature sufficient to melt said ash matter and wherein said hot combustion products enter said gravitating bed and pass upward through said gravitating bed to enter said lower zone and wherein said hot combustion products thereby heat said agglomerated ash matter and cause it to melt as it enters said space and wherein said combustion products are oxidizing in character with respect to iron;

g. withdrawing said molten ash matter from said space and conducting said molten ash matter into a second space containing a pool of water wherein said ash matter enters said pool of water and forms slag frit;

h. withdrawing water and slag frit from said second space; and i. discharging said separated products of gasification.

7. The process of claim 6 wherein said granulated solid fuel is selected from the group consisting of caking bituminous coals and wherein said fuel is supplied to said vessel at an elevation intermediate between said top and said bottom of said upper zone.

8. The process of claim 6 wherein at least a part of said fuel of said step (f) comprises smaller coke particles withdrawn from said smaller coke particles of said region and said upper zone.

9. The process of claim 6 wherein said fluidized bed zones are at a pressure greater than about 10 atmospheres.

* * * * *